Dec. 29, 1936.  E. LEVIN  2,065,902
GARMENT RACK JOINT
Filed July 2, 1935
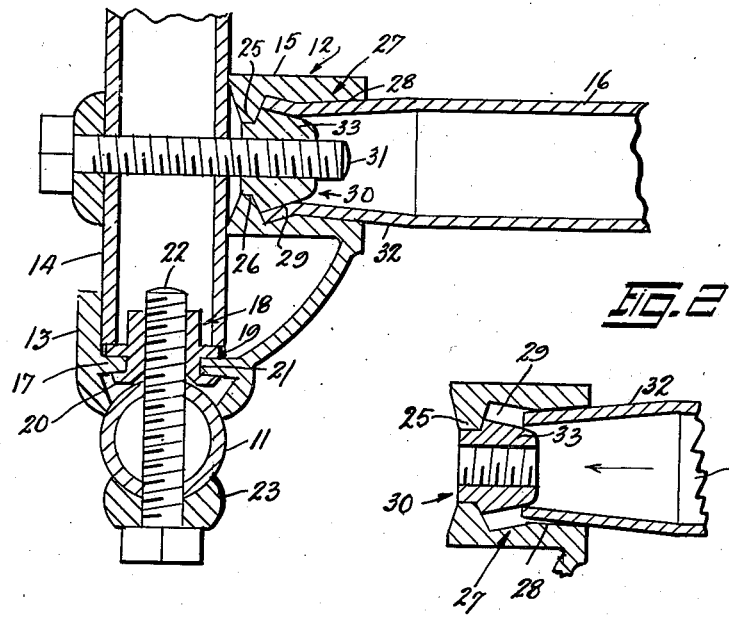
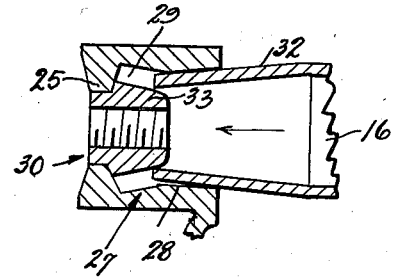
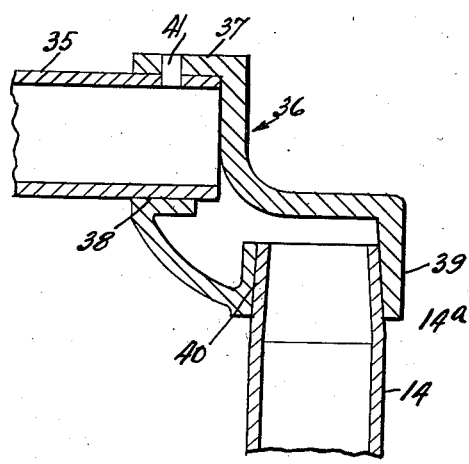
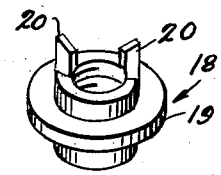
INVENTOR.
Edward Levin
BY *Maurice Bloch*
ATTORNEY.

Patented Dec. 29, 1936

2,065,902

UNITED STATES PATENT OFFICE 2,065,902

GARMENT RACK JOINT

Edward Levin, Brooklyn, N. Y.

Application July 2, 1935, Serial No. 29,461

1 Claim. (Cl. 287—54)

This invention relates to garment rack joints, and is adapted for use in connection with display racks and other devices made of tubular sections.

One of the objects of this invention is the provision of such a joint which will eliminate the use of the present day pipe fitting or fastening which is usually provided with extensions having threaded openings to receive the threaded ends of pipes or tubular sections.

Another object of this invention is the provision of a pipe joint comprising an elbow shaped fitting having a pair of pipe receiving openings at preferably right angles to each other, one of the said openings being provided with a double tapered opening for the reception of an unthreaded tapered pipe end, and with means for spreading and conforming the said pipe end to the double tapered opening for permanently anchoring the said pipe in the said opening.

A further object of the invention is the provision of means in the other of said fitting openings for detachably securing a second pipe section.

A still further object of the invention is the elimination of all threading operations on both the fitting proper and the tube sections.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which—

Figure 1 is a fragmental sectional view through the lower end of a display rack-joint made in accordance with my invention;

Fig. 2 is a fragmental sectional view of the upper portion of the lower rack-joint, showing the tapered pipe end before it is expanded and the tapered nut before expanding the said end.

Fig. 3 is a fragmental sectional view of the upper rack-joint; and

Fig. 4 is a perspective view of the nut shown in the lower portion of Fig. 1.

Referring now to the drawing in detail 11 indicates a tubular pipe section to which is secured an elbow-shaped fitting 12. The lower end of the said fitting 12 is provided with a bearing 13 for the reception of a vertical pipe section 14 and the upper portion of the fitting 12 has a bearing or hollow boss 15 for the reception of a horizontal pipe section 16.

The lower bearing 13 has an inner annular flange 17 through which passes a nut 18 (see Fig. 1) provided with an outer annular flange 19 which rests upon the flange 17. The nut 18 is further provided with a pair of wings 20 which are bent over to clamp the nut against the flange 17 and prevent same from falling through the opening 21 formed by the flange 17. A bolt 22 passing through the nut 18 secures the pipe section 11 to the fitting 12. A saddle or washer 23 is interposed between the head of the bolt 22 and the pipe section 11.

The upper bearing 15 is provided with an inner annular flange or shoulder 25 having a central opening 26, and is further provided with a larger opening 27 concentric with the opening 26, the said opening 27 having a portion 28 which tapers inwardly and a second portion 29 which tapers outwardly. A tapered and shouldered nut 30 is placed in the flange opening 26 and the tapered portion 31 thereof extends into the double tapered opening 27. A bolt or screw 31 passes through the said nut 30 and the vertical pipe section 14 to secure same in place. With the nut 30 drawn up against the flange 25 the tapered end 32 of the pipe section 16 is inserted into the opening 27 and is pressed inwardly against the tapered end 33 of the nut 30 which enters the pipe section and spreads the extreme end thereof to conform to the taper 29 in the bearing 15, thus permanently securing the said pipe in the bearing. It will be seen that the tapered end 32 of the pipe 16 conforms to the taper 28 in the bearing 15 and the taper on the nut 30 conforms to the taper 29 of the said bearing, and when the extreme end of the pipe 16 is expanded the pipe section 16 becomes wedged and cannot be moved one way or the other in the bearing 15.

The upper end of the rack is connected by means of a pipe 35 and a pair of pipe fittings 36 only one of which is shown in Fig. 3 of the drawing. The said fittings each comprise an upper bearing 37 having a straight opening 38 and a lower bearing 39 having a tapered opening 40 which conforms to the taper 14a at the upper ends of the vertical pipe sections 14. The pipe section 35 is secured in the bearings 37 by means of pins 41 and the entire structure, that is the pipe section 35 and fittings 36 is placed over the tapered ends of the pipe section 14 and driven home to complete the rack.

From the foregoing it will be seen that I have provided a garment rack which may readily be assembled and disassembled for shipping purposes, as by the removal of the bolts 31 the upright pipe sections 14 may be removed from their bearings 13 and the upper portion of the rack may be pulled or tapped off the tapered ends of the said upright sections 14.

Having described my invention what I claim as new and desire to secure by Letters Patent is—

In a garment rack, a rack joint therefor, comprising a fitting having a double tapered opening in which a rack section may be secured, an inner annular flange in the said fitting contiguous to the said opening, a tapered nut resting on the said flange, means on the said nut to clamp the nut against the said flange, and a bolt adapted to pass through the nut for securing the said rack section to the fitting.

EDWARD LEVIN.